Dec. 12, 1933.  G. FASSIN  1,939,547

MOUNTING FOR COLORIMETER PLUNGER AND THE LIKE

Filed May 22, 1931

GUSTAVE FASSIN
INVENTOR

BY *G. A. Ellestad*
ATTORNEY

Patented Dec. 12, 1933

1,939,547

UNITED STATES PATENT OFFICE 1,939,547

MOUNTING FOR COLORIMETER PLUNGER AND THE LIKE

Gustave Fassin, Irondequoit, N. Y., assignor to Bausch & Lomb Optical Company, Rochester, N. Y., a corporation of New York Application May 22, 1931. Serial No. 539,285

5 Claims. (Cl. 88—14)

This invention relates to optical instruments and more particularly it has reference to means for attaching glass optical elements to mountings.

One of the objects of my invention is to provide an improved means for securing glass optical elements in mountings. Another object is to provide an improved means for attaching glass optical elements to metallic mountings without the use of a cementitious substance. Still another object is to provide a simple yet efficient means for securing glass colorimeter plungers in metal mountings without the use of a cementitious substance. These and other objects and advantages reside in certain novel features of construction, arrangement and combination of parts as will hereinafter be more fully explained and pointed out in the appended claims.

Referring to the drawing.

Figure 2:
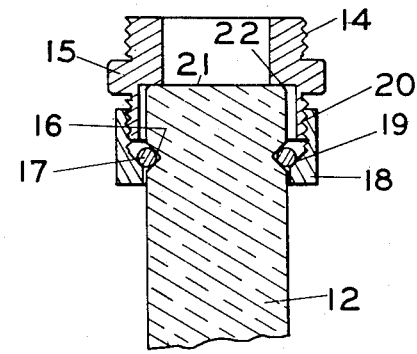
Fig. 2 is an enlarged sectional view showing the application of my invention for mounting a colorimeter plunger.
Figure 1:
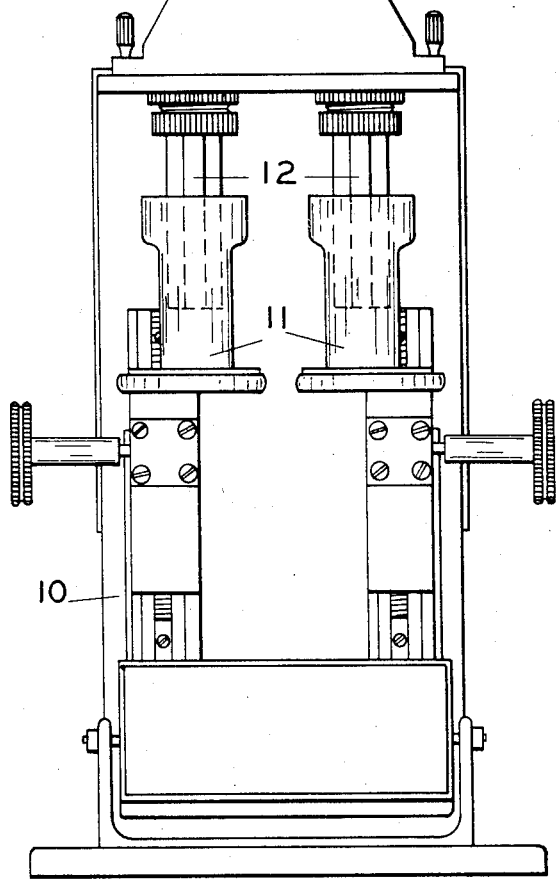
Fig. 1 is a front elevation of a colorimeter embodying my invention.
Figure 3:
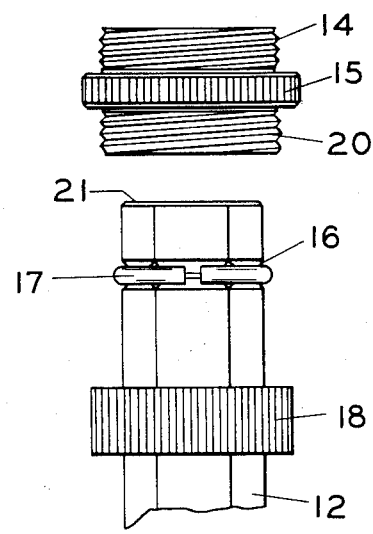
Fig. 3 is a fragmentary view showing the parts of the colorimeter plunger mounting in separated relation.

One embodiment of my invention is illustrated in the drawing wherein 10 indicates a colorimeter of a well known type having the two adjustably mounted cups 11, the two fixed plungers 12 and the usual viewing tube 13. The glass plunger 12 is removably secured to the stand of the colorimeter 10 by means of the threaded portion 14 on bushing 15. The plunger 12 is provided with a groove 16 which extends completely around the plunger and receives a split wire ring 17. A collar 18, having an inclined surface 19, is secured by threads 20 to bushing 15. It will therefore be obvious that by tightening the collar 18 the upper plane face 21 of plunger 12 is held firmly against the lower plane face 22 of the bushing 15. Since the plane faces 21 and 22 are carefully ground, an air-tight and liquid-tight joint is formed. The bushing 15 and collar 16 can be formed of metal or any other suitable material.

Although I have shown my invention as applied to a colorimeter plunger of the solid rod type, my improved mounting can likewise be used for attaching colorimeter plungers which are formed of glass cylinders. In such case, the groove 16 would merely be formed in the cylinder wall which would, of course, have ample thickness. My improved mounting can also be used to provide a means for securing cover plates on the ends of polarimeter and saccharimeter observation tubes, as will be apparent to those skilled in the art.

From the foregoing it will be apparent that I am able to attain the objects of my invention and provide an improved means for attaching glass optical elements to mountings. Under the prior art practice, glass plungers for colorimeters are secured to metal mountings by the use of some cementitious substance. The use of cement for mounting the plungers is highly unsatisfactory because the plunger works loose in its mounting under hard usage. The action of various reagents and solutions also tends to loosen the cemented plunger in its mounting. Under such conditions the plungers sometimes drop out and get broken and when attempts are made to re-cement the plungers it is difficult to get them in proper alignment. By the use of my improved mounting, the plunger can be easily removed for cleaning and it can be replaced without danger of getting it out of alignment. Various modifications can obviously be made without departing from the spirit of my invention.

I claim:

1. A glass colorimeter plunger having a groove formed on its outer surface, a ring mounted in said groove, a bushing having a recess, the end of said plunger being positioned in said recess, a collar threaded to said bushing, said collar having a surface in contact with said ring whereby said plunger is removably secured in said bushing.

2. In a colorimeter the combination of a glass plunger, said plunger having a groove formed in its outer surface, a split ring mounted in said groove, a bushing having a shoulder, said plunger having a surface in contact with said shoulder, and a collar threaded to said bushing, said collar having a surface engaging said ring whereby said plunger is removably secured to said bushing.

3. A colorimeter plunger comprising a transparent optical element having a groove with a shoulder portion, a member having an opening, a seat formed around said opening, said element being positioned with one face in contact with said seat and a second member detachably secured to said first member, said second member cooperating with said shoulder portion to hold said element against said seat.

4. An optical instrument having in combination a member having an aperture, a seat formed around said aperture, a glass optical element having a surface in contact with said seat, said element having a shoulder portion, a yieldable member engaging said shoulder portion, a collar surrounding said element, said collar being threadedly secured to said first named member, said collar having a portion engaging said yieldable member to detachably hold said element in contact with said first named member.

5. In a colorimeter the combination of a glass plunger having a shoulder portion, a member having an opening, a seat formed around said opening, said plunger being positioned with one face in contact with said seat, a second member having an opening through which said plunger projects, said second member being threadedly secured to said first member and means associated with said second member and cooperating with said shoulder portion to detachably hold said plunger against the seat on said first named member.

GUSTAVE FASSIN.